United States Patent
Woo et al.

(10) Patent No.: US 10,756,656 B2
(45) Date of Patent: Aug. 25, 2020

(54) FAULT TOLERANT PERMANENT MAGNET DC MOTOR DRIVES

(71) Applicant: STEERING SOLUTIONS IP HOLDING CORPORATION, Saginaw, MI (US)

(72) Inventors: Julius M. Woo, Saginaw, MI (US); Prerit Pramod, Saginaw, MI (US); Mohammed R. Islam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 22 days.

(21) Appl. No.: 16/124,727

(22) Filed: Sep. 7, 2018

(65) Prior Publication Data

US 2020/0083826 A1    Mar. 12, 2020

(51) Int. Cl.
*H02P 7/292*    (2016.01)
*B62D 5/04*    (2006.01)

(52) U.S. Cl.
CPC ............ *H02P 7/292* (2013.01); *B62D 5/0463* (2013.01)

(58) Field of Classification Search
CPC .............................. H02P 7/292; B62D 5/0463
See application file for complete search history.

(56) References Cited

U.S. PATENT DOCUMENTS

| | | | |
|---|---|---|---|
| 2003/0045981 A1* | 3/2003 | Kifuku | B62D 5/0469 701/41 |
| 2004/0021437 A1* | 2/2004 | Maslov | B60L 8/00 318/400.01 |
| 2005/0017664 A1 | 1/2005 | Takahashi et al. | |
| 2005/0253479 A1 | 11/2005 | Lakerdas et al. | |
| 2012/0001506 A1 | 1/2012 | Orban et al. | |
| 2012/0086297 A1 | 4/2012 | Makino | |
| 2014/0028230 A1* | 1/2014 | Yamaguchi | H02P 6/16 318/400.38 |
| 2018/0112907 A1* | 4/2018 | Harrell | H02P 29/40 |

FOREIGN PATENT DOCUMENTS

WO    0221665 A2    3/2002

OTHER PUBLICATIONS

International Search Report for PCT/US/2017/063692 dated Aug. 27, 2018; 5 pages.
Written Opinion of the International Searching Authority for PCT/US2017/063692 dated Aug. 27, 2018; 8 pages.

* cited by examiner

*Primary Examiner* — Muhammad S Islam
(74) *Attorney, Agent, or Firm* — Dickinson Wright PLLC

(57) ABSTRACT

Technical solutions are described for generating an output torque from a multi-winding PMDC motor. An example method includes generating, by a current controller, a first voltage command for a first winding set from a plurality of winding sets of the PMDC motor, the first winding set generates a first current in response to the first voltage command. The method further includes generating, by the current controller, a second voltage command for the second winding set from the winding sets of the PMDC motor, the second winding set generates a second current in response to the second voltage command. The method further includes generating, by the PMDC motor, the output torque based on the first current and the second current.

20 Claims, 10 Drawing Sheets

FAULT TOLERANT PERMANENT MAGNET DC MOTOR DRIVES

CROSS REFERENCE TO RELATED APPLICATION

This application is a continuation of International Application No. PCT/US2017/063692, filed Nov. 29, 2018, which is incorporated in its entirety herein.

BACKGROUND

The present application is generally related to permanent magnet DC motor (PMDC motor) drives, and particularly to fault tolerant operation of PMDC motor drives.

Demands for fault tolerant operation of safety critical systems, such as those involved in automotive sub-systems including electric power steering (EPS) and autonomous driving assistance systems (ADAS), are increasing. Such demand has triggered introduction of redundancy in electromechanical motion control systems, which results in improved fault tolerance and thus fail-safe operation. The electric drive systems typically include an electric machine, one or more power converters and sensors, and other components for facilitating operation of the motion control systems.

Accordingly, it is desirable to introduce redundancy in the drive systems to improve fault tolerance of the automotive sub-systems and other components that use such electric drive systems.

SUMMARY

According to one or more embodiments, a system includes a permanent magnet DC (PMDC) motor comprising multiple winding sets. A first winding set from the multiple winding sets includes a first pair of magnet poles, a first pair of brushes, and a first winding. Further, a second winding set from the multiple winding sets includes a second pair of magnet poles, a second pair of brushes, and a second winding. The system further includes a controller that causes the PMDC motor to generate a predetermined amount of torque by applying a first voltage command for the first winding set, wherein the first winding set generates a first current in response to the first voltage command, and by applying a second voltage command for the second winding set, wherein the second winding set generates a second current in response to the second voltage command. The first current and the second current cause the motor to generate the predetermined amount of torque.

According to one or more embodiments a permanent magnet DC (PMDC) motor includes multiple winding sets. A first winding set from the multiple winding sets includes a first pair of magnet poles, a first pair of brushes, and a first winding. A second winding set from the multiple winding sets includes a second pair of magnet poles, a second pair of brushes, and a second winding. The first winding set generates a first current command in response to a first voltage command from a controller. The second winding set generates a second current command in response to a second voltage command from the controller.

According to one or more embodiments a method for generating an output torque from a multi-winding PMDC motor includes generating, by a current controller, a first voltage command for a first winding set from a plurality of winding sets of the PMDC motor, wherein the first winding set generates a first current in response to the first voltage command. The method further includes generating, by the current controller, a second voltage command for the second winding set from the winding sets of the PMDC motor, wherein the second winding set generates a second current in response to the second voltage command. The method further includes generating, by the PMDC motor, the output torque based on the first current and the second current.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Permanent Magnet DC (PMDC) motors are widely employed for automotive applications, such as in electric power steering (EPS) systems. PMDC motors have three major components, namely a stator, a rotor, and a commutator. Typically, the stator contains the magnet poles, and the rotor is an armature, which carries the windings. The commutator is attached to brushes and slip rings, which allow mechanical commutation of the machine. Here the machine may be the PMDC motor itself, or a system such as an EPS system, that employs the PMDC motor. The brushes are connected to phase-lead terminals through which voltages can be applied to the machine. Brushes are typically susceptible to mechanical wear. The mechanical wear can result in a failure of the PMDC motor after which the machine can no longer be operated. In an EPS system setting, not using the PMDC motor results in loss of assist to a driver. In addition to the electric machine, the power converter circuits as well as the microcontroller (logic) boards used for control of the electric drive system are also prone to failures.

The technical solutions described herein address the technical challenges above by facilitating a PMDC based electric drive system to be a fault tolerant by including techniques for introducing redundancy in the PMDC machine, along with control architectures involving redundancy in the power converter and logic circuitry. Further, the technical solutions also provide an analytical model of the PMDC machine. It should be noted that various implementations of the technical solutions described herein use examples of an EPS system however, the technical solutions are also applicable in other settings, such as power tools, rotor pumps, and industrial applications, among other instances where PMDC motors are used.

Figure 1:
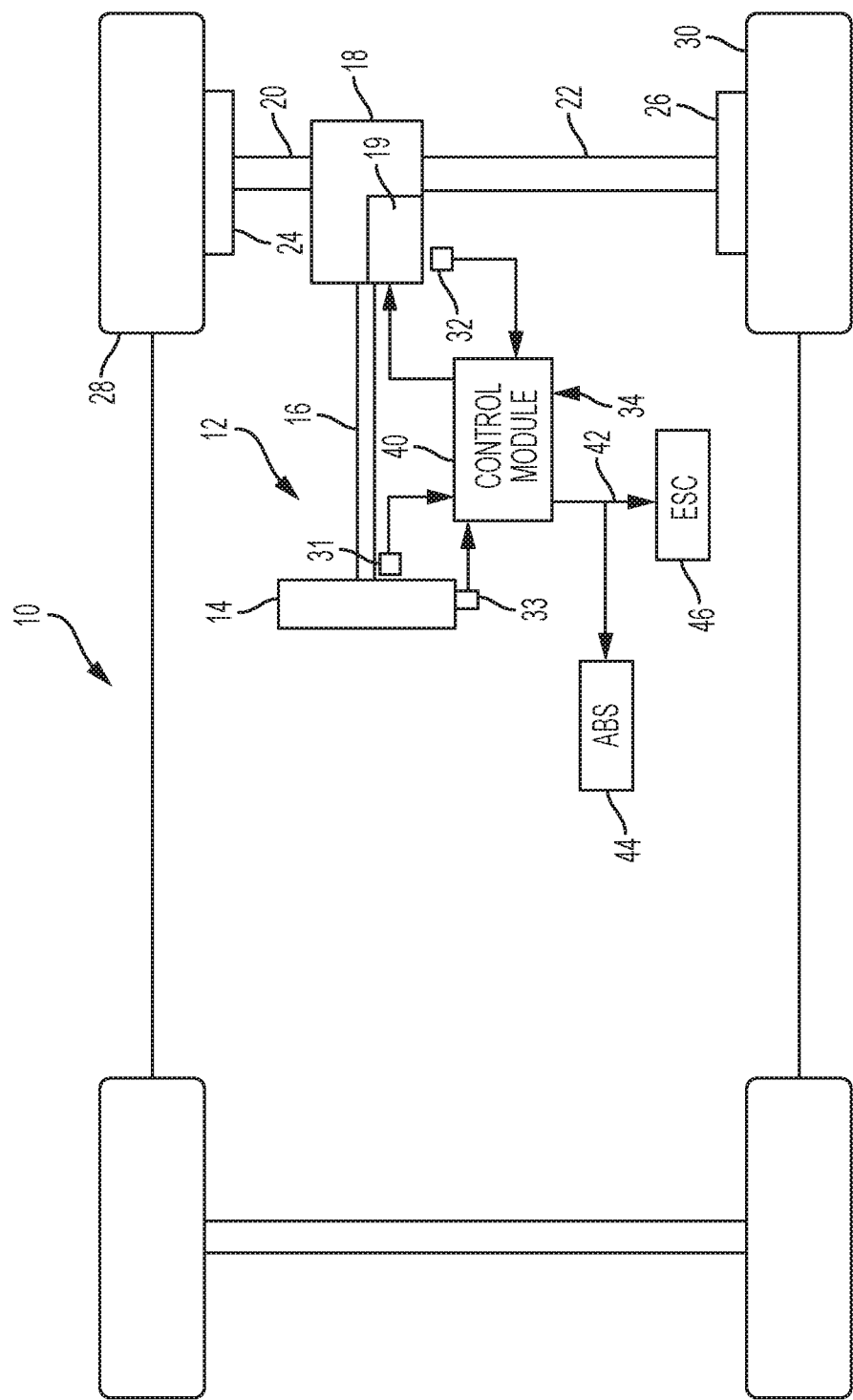
FIG. 1 is an exemplary embodiment of a vehicle 10 including a steering system.

Referring now to the Figures, where the technical solutions will be described with reference to specific embodiments, without limiting same, FIG. 1 is an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning to control aspects of the steering system 12 through the steering assist unit 18. Communication with other subcomponents of the vehicle 10, such as an Anti-lock Braking System (ABS) 44, an Electronic Stability Control (ESC) system 46, and other systems (not depicted), can be performed using, for example, a controller area network (CAN) bus or other vehicle network known in the art to exchange signals such as the vehicle speed signal 34.

In one or more examples, the motor 19 is a PMDC motor that is controlled using technical solutions described herein.

Figure 2:
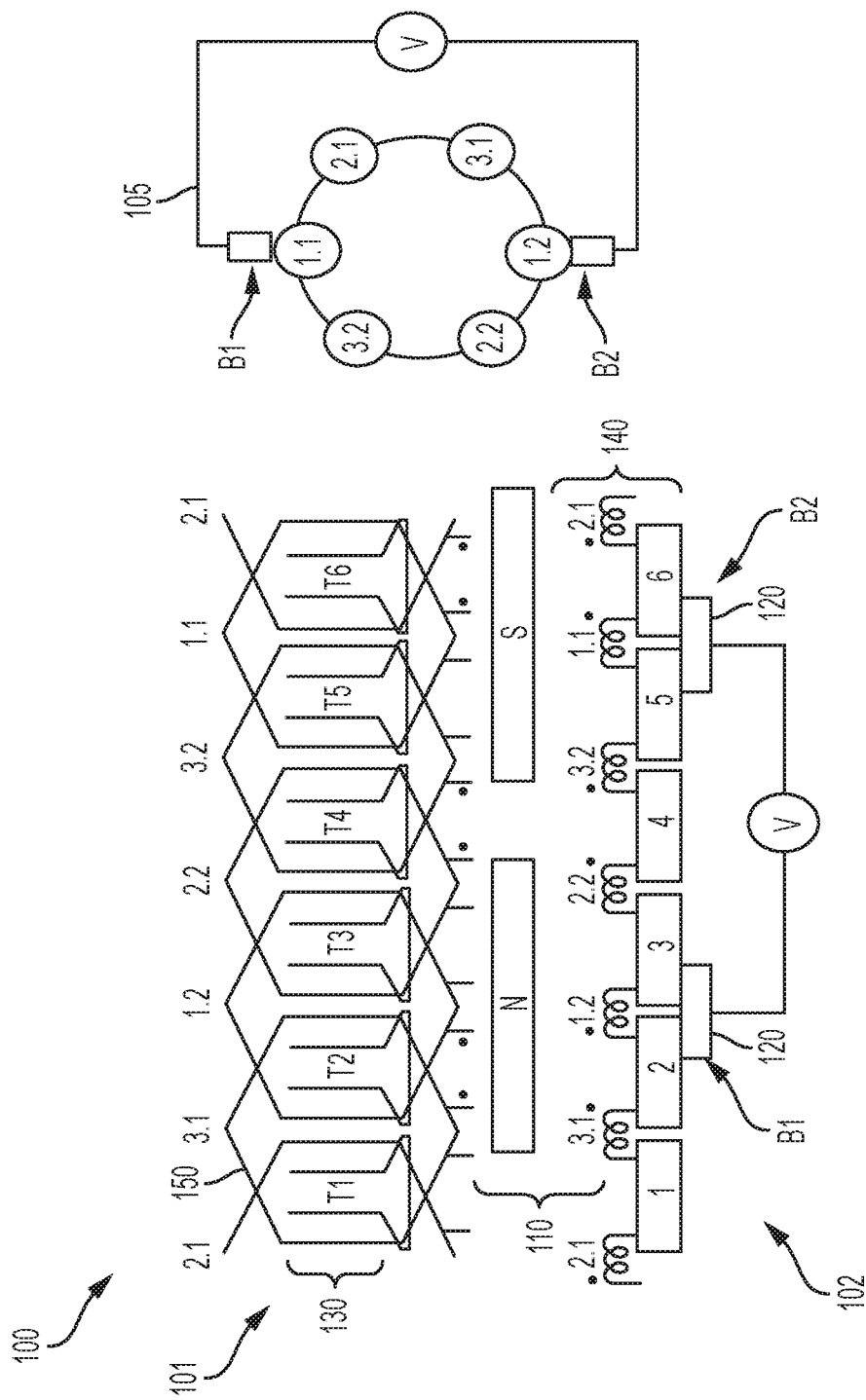
FIG. 2 depicts a construction of a PMDC machine according to one or more embodiments.

FIG. 2 depicts a construction of a PMDC machine according to one or more embodiments. In the illustration, construction of the PMDC machine a first view 101 and a second view 102 are depicted. As shown, a PMDC machine 100 includes one magnet pole pair (N and S) 110, a brush pair (B1 and B2) 120, six rotor slots (gaps between rotor poles T1-T6) 130 and commutator segments (1.1-1.2, 2.1-2.2, and 3.1-3.2) 140 corresponding to each, with a simplex lap winding 150. FIG. 2 further includes a view of an equivalent circuit 105 of the machine. It should be noted that the technical solutions described herein are not limited to a PMDC machine 100 with configuration shown in FIG. 2. Rather, the PMDC machine 100, in other examples, can include additional brush pairs 120, magnet pole pairs 110. Alternatively, or in addition, the PMDC machine 100, in other examples, may include a different number of rotor slots 130, or a different manner of winding for the commutator segments 140.

Figure 3:
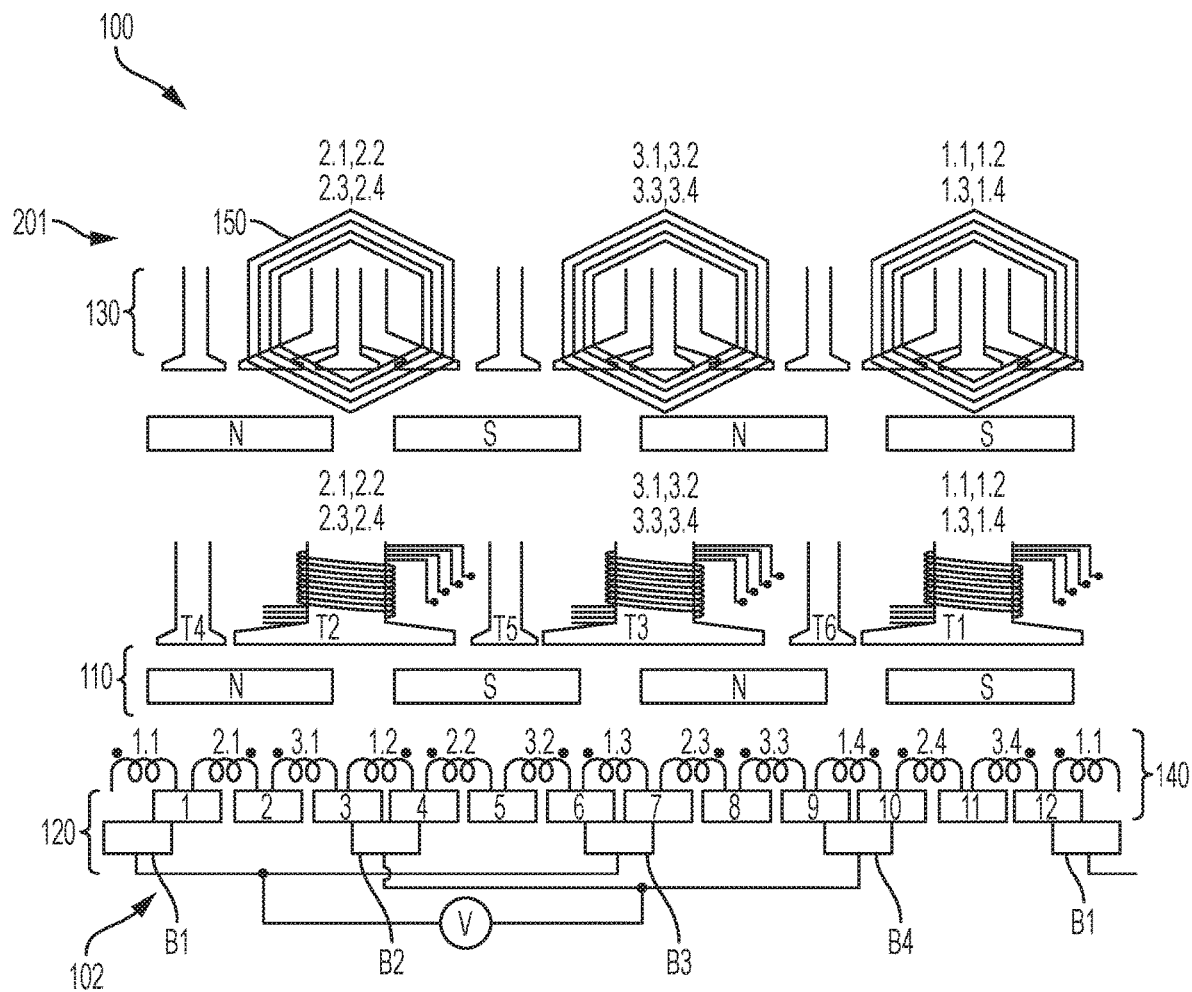
FIG. 3 depicts another construction of a PMDC machine according to one or more embodiments.

FIG. 3 depicts another construction of a PMDC machine according to one or more embodiments. In the illustration, a construction of the PMDC machine using a first view 201 and a second view 202 are depicted. The PMDC machine 100 includes two magnet pole pairs 110, two brush pairs (B1-B2, and B3-B4) 120, 6 rotor slots (gaps between rotor poles T1-T6) 130 and corresponding 12 commutator segments (1.1-1.4, 2.1-2.4, and 3.1-3.4) 140. The winding 150 in the PMDC machine 100 uses lap winding.

In both, FIG. 2 and FIG. 3, because the terminals of the PMDC machine 100 are such that the brushes 120 are tied together, the PMDC machine 100 does not operate satisfactorily when brush failures occur. The technical solutions described herein address such technical challenge by providing redundancy within the PMDC machine 100 by adding multiple winding sets within the rotor slots 130, along with additional brush pairs 120, and terminal(s) drawn out separately from each brush pair 120. For example, the technical solution to redundancy may make use of 2 separate motor drives (i.e. 2 motors, 2 inverters and 2 micro controllers). Using such multiple sub-systems leads to additional cost and further requiring additional packaging and housing of the components. The technical solutions described herein uses a single motor in different ways such as: (1) multiple winding in the motor with multiple pairs of brushes controlling through one micro controller but multiple inverters (2) multiple winding with multiple brush pairs controlling through multiple controllers and inverters.

The technical solutions described herein facilitate including multiple PMDC machines within the same physical stator and rotor structure of a single PMDC machine. The present disclosure refers to such PMDC machines including multiple PMDC machines "multi-winding PMDC machines". Further, the technical solutions include control architectures for the multi-winding machines including redundant power converters and logic circuitry.

The mathematical model of a single wound PMDC machine, such as the PMDC machine 100 (FIG. 2/FIG. 3) is expressed as follows:

$$V = L\dot{I} + RI + K_e \omega_m + V_{bd}$$

$$T_e = K_e I$$

where V, I and $T_e$ are the terminal voltage, current and electromagnetic torque of the machine, and L, R, $K_e$ and $V_{bd}$ are the inductance, resistance, voltage (torque) constant and brush drop. Note that the brush drop term is nonlinear, and may be expressed as follows.

$$V_{bd} = \sigma(I) V_0 \left( 1 - e^{-\left|\frac{I}{I_0}\right|} \right)$$

where $V_0$ and $I_0$ are state variables of the brush drop function. The machine parameters vary nonlinearly with operating conditions due to varying temperature and magnetic saturation.

In a multi-winding PMDC machine, an additional magnetic (inductive) coupling exists between the phases. Due to this coupling, the machine model differs from the single-wound machine expressed above.

Figure 4:
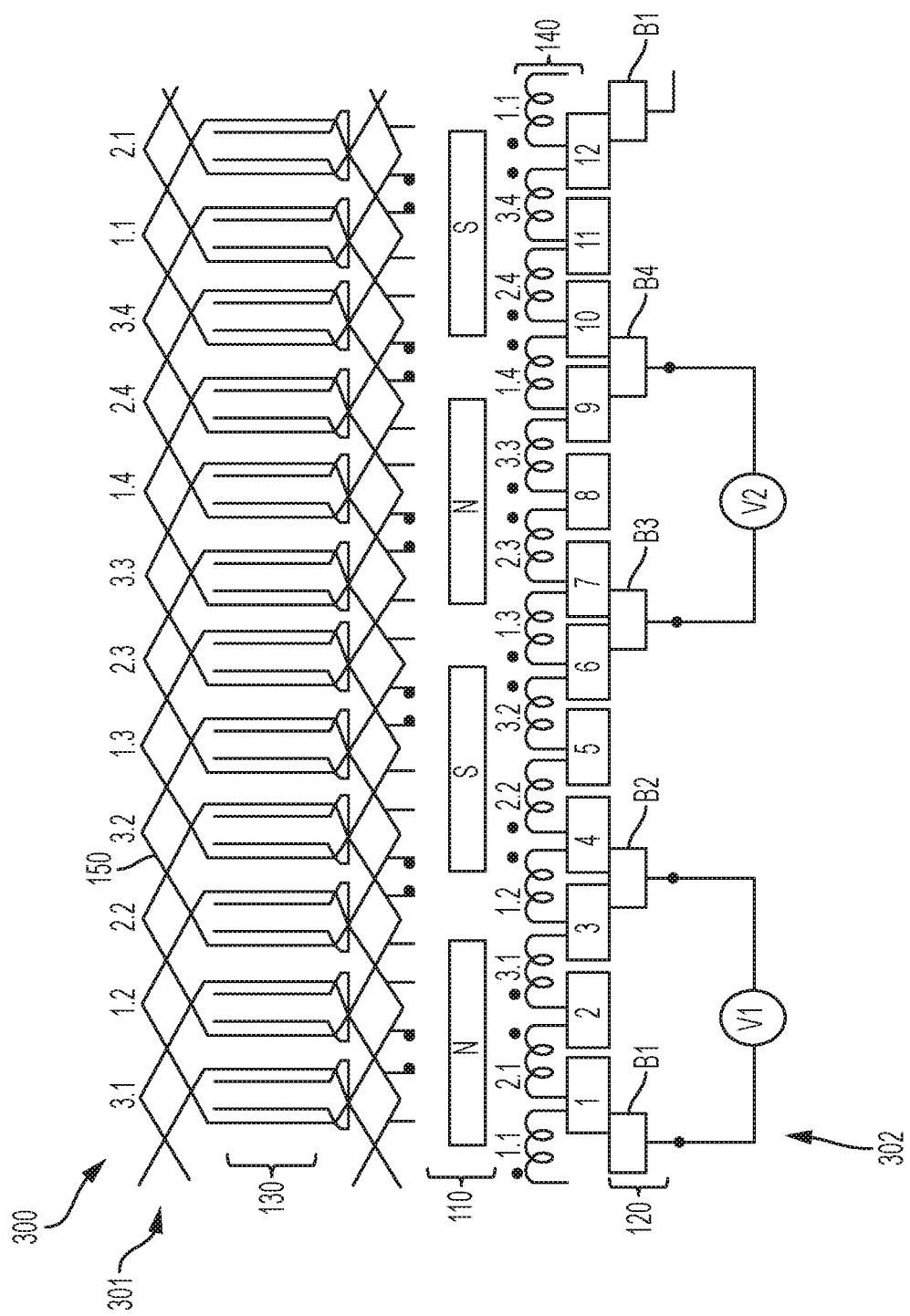
FIG. 4 depicts an example multi-winding PMDC machine according to one or more embodiments.

FIG. 4 depicts an example multi-winding PMDC machine according to one or more embodiments. The multi-winding PMDC machine 300 from FIG. 4 is a "dual-wound PMDC machine" with 4 stator poles (i.e., 2 pole pairs) 110, 12 commutator plates 130 and rotor slots each, and 4 brushes (2 brush pairs B1-B4) 120. Further, the dual-winding PMDC machine 300 has a distributed lap winding 150 with diametrical pitch.

Figure 5:
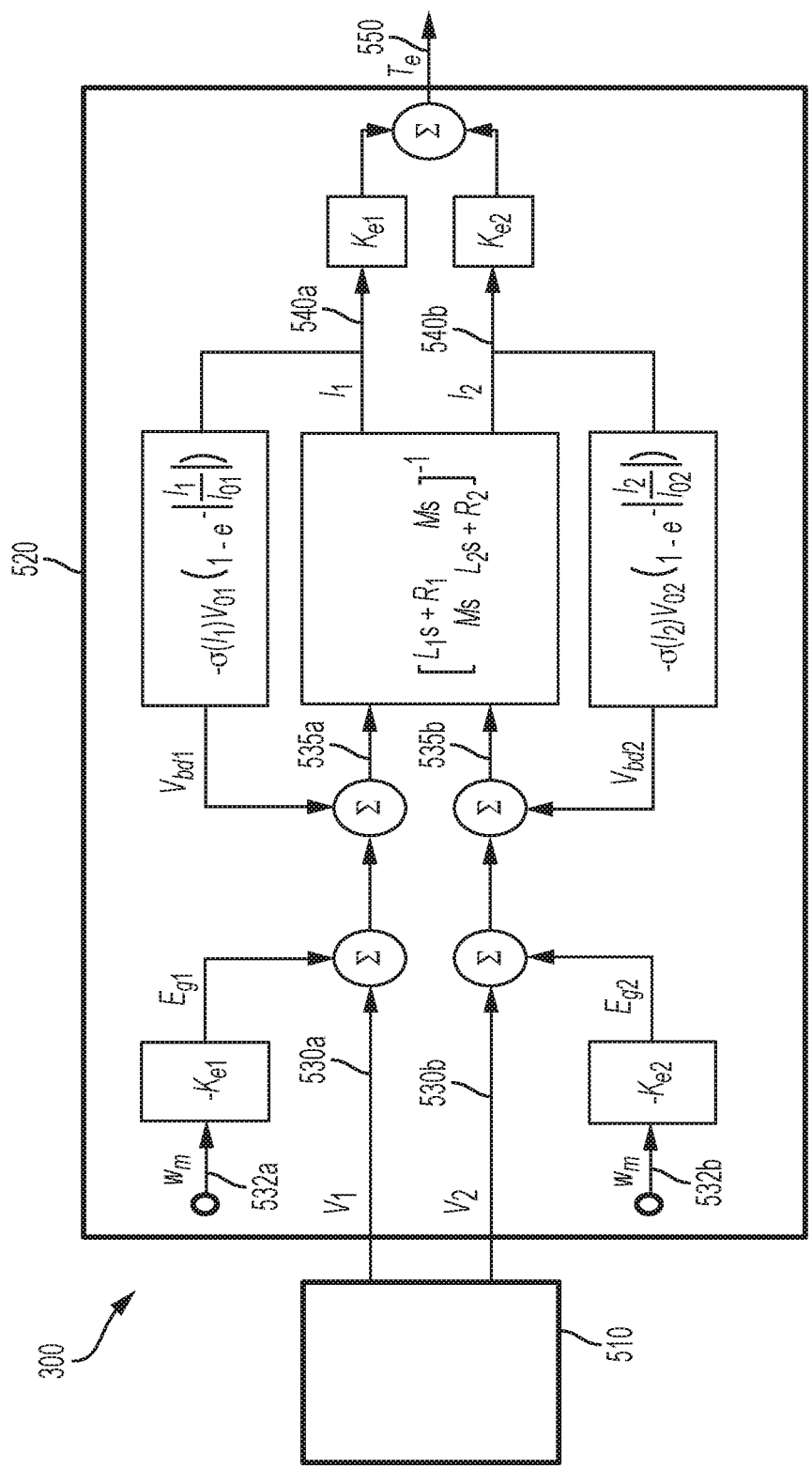
FIG. 5 depicts a block diagram of a dual-winding PMDC machine using a mathematical model according to one or more embodiments.

FIG. 5 depicts a block diagram of a dual-winding PMDC machine using a mathematical model according to one or more embodiments. The view of the dual-winding PMDC machine 300 depicts a controller 510 and a PMDC motor 520, the motor 520 including dual-windings in this case. In one or more examples, the controller 510 operates in the feedback control mode. For the dual-winding PMDC motor 520 two input voltage, $V_1$ 530a and $V_2$ 530b, may be based on voltage commands generated by the controller 510, for example through a power controller (not shown). It should be noted that while ideally the voltage commands generated by the controller 510 are equal to the input voltages $V_1$ 530a and $V_2$ 530b of the PMDC motor 520, in practice the values may be slightly different due to, for instance, nonlinearities in the power converter circuitry.

Further, the voltage commands are modified because of back-EMFs ($\omega_m$) for each respective winding. the back-EMFs based on a velocity of the motor 520. For example, a first back-EMF voltage ($\omega_m$) 532a of the first winding set of the motor 520 is based on the motor velocity and a first back-EMF (and torque) constant $K_{e1}$ of the first winding set. Similarly, a second back-EMF voltage ($\omega_m$) 532b of the second winding set of the motor 520 is based on the motor velocity and a second back-EMF (and torque) constant $K_{e2}$ of the second winding.

The voltage commands 530a-b are further modified because of the brush drop voltage ($V_{bd}$) of each winding. For example, the first voltage V1 530a is added with the brush drop voltage of the first winding, and the second voltage V2 is added with the brush drop voltage of the second winding. The voltages get converted into the currents 540a and 540b for each winding based on the inductance and resistance of each winding, and the current further produces the resultant torque ($T_e$) 550 from the motor 520. The output torque 550 is proportional to the currents $I_1$ and $I_2$ based on the corresponding constants $K_{e1}$ and $K_{e2}$ for each winding. Further, a magnetic coupling (M) between the two windings further affects the currents produced by the voltage commands.

Because of the additional magnetic coupling between the phases of the dual-winding PMDC machine 300, in comparison to a single wound PMDC machine 200, the machine model of the machine 300 differs from that of the single-wound machine 100. For example, the mathematical model for the dual-wound PMDC machine 300 is given as follows.

$$V_1 = L_1 \dot{I}_1 + R_1 I_1 + K_{e1} \omega_m + \sigma(I_1) V_{01} \left( 1 - e^{-\left|\frac{I_1}{I_{01}}\right|} \right) + M_{12} \dot{I}_2$$

$$V_2 = L_2 \dot{I}_2 + R_2 I_2 + K_{e2} \omega_m + \sigma(I_2) V_{02} \left( 1 - e^{-\left|\frac{I_2}{I_{02}}\right|} \right) + M_{21} \dot{I}_1$$

$$T_e = K_{e1} I_1 + K_{e2} I_2$$

where $M_{12} = M_{21} = M$ represents the inductive coupling between the two phases. The mutual inductance terms ($M_{12} I_2$, and $M_{21} I_1$), in general, vary nonlinearly with the machine currents $I_1$ and $I_2$.

This model can easily be extended to a n-phase PMDC machine, where n represents a number of windings used (or a number of redundant machines included in the single PMDC machine). A general model of a n-phase machine may be expressed as follows.

$$V_1 = L_1 \dot{I}_1 + R_1 I_1 + K_{e1} \omega_m + \sigma(I_1) V_{01} \left( 1 - e^{-\left|\frac{I_1}{I_{01}}\right|} \right) +$$
$$M_{12} \dot{I}_2 + M_{13} \dot{I}_3 + \ldots + M_{1n} \dot{I}_n$$

$$V_2 = L_2 \dot{I}_2 + R_2 I_2 + K_{e2} \omega_m + \sigma(I_2) V_{02} \left( 1 - e^{-\left|\frac{I_2}{I_{02}}\right|} \right) +$$
$$M_{21} \dot{I}_1 + M_{23} \dot{I}_3 + \ldots + M_{2n} \dot{I}_n$$

$$\vdots$$

$$V_n = L_n \dot{I}_2 + R_n I_2 + K_{en} \omega_m + \sigma(I_n) V_{0n} \left( 1 - e^{-\left|\frac{I_n}{I_{0n}}\right|} \right) +$$
$$M_{n1} \dot{I}_1 + M_{n2} \dot{I}_2 + \ldots + M_{n-1,n} \dot{I}_{n-1}$$

$$T_e = K_{e1} I_1 + K_{e2} I_2 + \ldots + K_{en} I_n$$

where the mutual inductances are specified to be different for generalization. Notice that the mutual inductances for two winding sets (set a and b say) are equal, i.e. $M_{ab} = M_{ba}$. For simplicity, the rest of the description is presented for a dual winding machine, which may be extended to a general n-phase machine. The voltage-current equations of the dual-wound machine may be represented in transfer matrix form as follows.

$$\begin{bmatrix} V_1 \\ V_2 \end{bmatrix} = \begin{bmatrix} L_1 s + R_1 & Ms \\ Ms & L_2 s + R_2 \end{bmatrix} \begin{bmatrix} I_1 \\ I_2 \end{bmatrix} + \begin{bmatrix} K_{e1} \omega_m \\ K_{e2} \omega_m \end{bmatrix} + \begin{bmatrix} V_{bd1} \\ V_{bd2} \end{bmatrix}$$

$$\begin{bmatrix} V_1 \\ V_2 \end{bmatrix} - \begin{bmatrix} K_{e1} \omega_m \\ K_{e2} \omega_m \end{bmatrix} - \begin{bmatrix} V_{bd1} \\ V_{bd2} \end{bmatrix} = \begin{bmatrix} L_1 s + R_1 & Ms \\ Ms & L_2 s + R_2 \end{bmatrix} \begin{bmatrix} I_1 \\ I_2 \end{bmatrix}$$

where the two brush drop terms are assumed to be independent of currents in order to generate the transfer matrix representation of the PMDC machine (because the transfer matrix representation in the frequency domain requires a linear time-invariant model in the time-domain). Thus, the output currents may be expressed in terms of the input voltages as follows.

$$\begin{bmatrix} I_1 \\ I_2 \end{bmatrix} = \begin{bmatrix} L_1 s + R_1 & Ms \\ Ms & L_2 s + R_2 \end{bmatrix}^{-1} \left( \begin{bmatrix} V_1 \\ V_2 \end{bmatrix} - \begin{bmatrix} K_{e1} \omega_m \\ K_{e2} \omega_m \end{bmatrix} - \begin{bmatrix} V_{bd1} \\ V_{bd2} \end{bmatrix} \right)$$

$$= \frac{1}{\Delta(s)} \begin{bmatrix} L_2 s + R_2 & -M \\ -M & L_1 s + R_1 \end{bmatrix} \left( \begin{bmatrix} V_1 \\ V_2 \end{bmatrix} - \begin{bmatrix} K_{e1} \omega_m \\ K_{e2} \omega_m \end{bmatrix} - \begin{bmatrix} V_{bd1} \\ V_{bd2} \end{bmatrix} \right)$$

where $\Delta(s) =$ $(L_1 s + R_1)(L_2 s + R_2) - s^2 M^2 = (L_1 L_2 - M^2) s^2 + (L_1 R_2 + L_2 R_1) s + R_1 R_2.$ When the winding arrangement is symmetrical and the two brush pairs are similar, the above model may be simplified to assume that the half-machines are identical, i.e., the self-inductances, resistances, voltage constants and brush drop parameters are equal.

Thus, in the dual-winding PMDC machine 300, the controller 510 uses both the windings concurrently to generate the output torque 550 by generating voltage commands that cause the voltages 530*a*-*b* such that the resulting currents result in the output torque 550. The controller 510 generates voltage commands 530*a*-*b* based on the output torque 550 that is to be generated by the motor 520. In case one of the windings fails, for example the first winding, the second voltage command 530*b* on the second winding continues to generate corresponding current 540*b* resulting in at least a partial output torque 550.

Alternatively, or in addition, the controller 510 generates only a single voltage command to cause an input voltage, for example the first voltage 530*a* to generate the output torque using only the first winding. In case of a failure in the first winding, the controller 510 subsequently uses the second winding to generate the second voltage command causing a second input voltage V2 530*b* to generate the output voltage 550.

The above model is extendible to an n-winding PMDC machine (instead of just the dual-winding), where the controller 510 uses more than two voltage commands $V_1$-$V_n$ for n-windings, each resulting in corresponding currents $I_1$-$I_n$, and which together cause the motor to generate the output torque $T_e$ 550.

Figure 6:
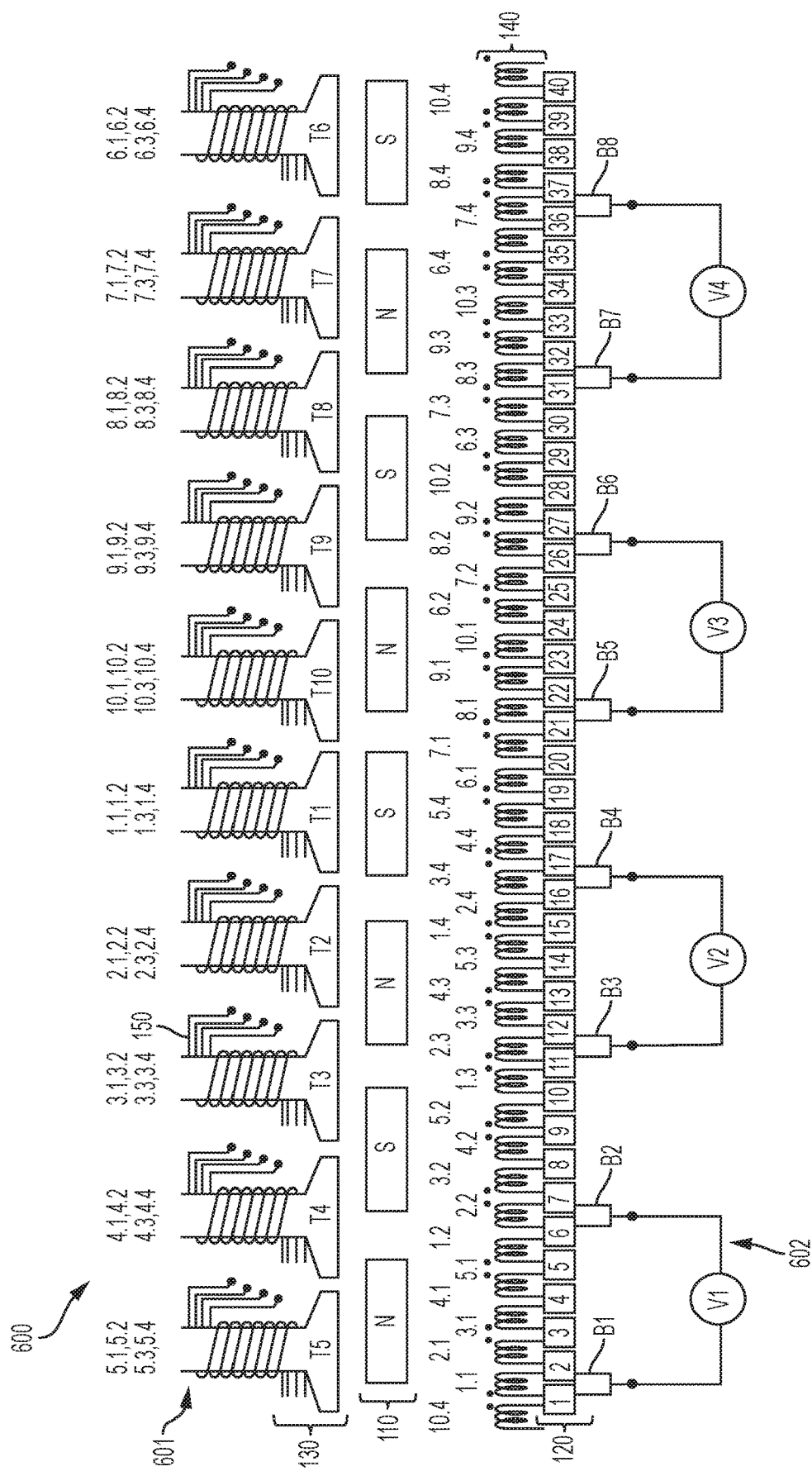
FIG. 6 depicts an example multi-winding PMDC machine according to one or more embodiments.

FIG. 6 depicts an example multi-winding PMDC machine according to one or more embodiments. The multi-winding PMDC machine 600 from FIG. 6 includes four PMDC machines with four magnet pole pairs (stator), four brush pairs (B1-B8) 120, 40 commutator segments (1.1-1.4-10.1-10.4), and 10 rotor slots (gaps between rotor poles T1-T10) 130 for placing the windings 150. The multi-winding PMDC machine 600 thus has multiple (four) windings with multiple brush-pairs and terminals because of which, the PMDC machine 600 effectively includes multiple PMDC machines within the same physical stator and rotor structure. Thus, under a single brush failure, the PMDC machine 300 continues operation with the remaining (healthy) terminals. In the illustrated example, the four sets of terminals facilitate fault tolerant operation under brush failures.

For the multi-winding PMDC machine 600 to be fault tolerant by providing redundancy, the multi-winding PMDC machine 600 includes a number of magnet pole pairs 110 in the stator greater than or equal to a number of brush pairs 120, and the magnet pole pairs 110 is an integral multiple of the number of brush pairs 120. Further, the number of rotor slots 130 used for the windings 150 is based on the number of brush pairs 120. In addition, the winding arrangement may be chosen differently for different purposes in different examples of the multi-winding PMDC machine 600. For instance, for the dual-winding PMDC machine 300 (which is one type of a multi-winding PMDC machine with two windings), the conductors for the two half-machines may be in half of rotor, or the conductors may be placed in alternate slots across the rotor circumference. It should also be noted that the number of redundant machines in a multi-winding PMDC machine is chosen based on the application under consideration, which includes consideration of the machine geometry, in order to ensure mechanical strength of the machine. It should be noted that the above are is a general set of rules used for implementing one or more embodiments described herein. The technical solutions described herein facilitate the construction of an n-winding set PMDC machine (and n-power converters and n-micocontrollers), and there are various ways of constructing such a PMDC machine using the technical features described herein.

The multi-winding PMDC machine 600 facilitates that if one brush-pair (winding set), the electric drive continues to provide $$\frac{n-1}{n}$$

of the total power. This improves the fault tolerance of the drive system and thus provides capability for fail-safe operation.

Further, in addition to using a multi-winding PMDC machines, the technical solutions described herein facilitates additional redundancy by using control architectures containing multiple power converters (H-bridges) and/or microcontrollers.

Figure 7:
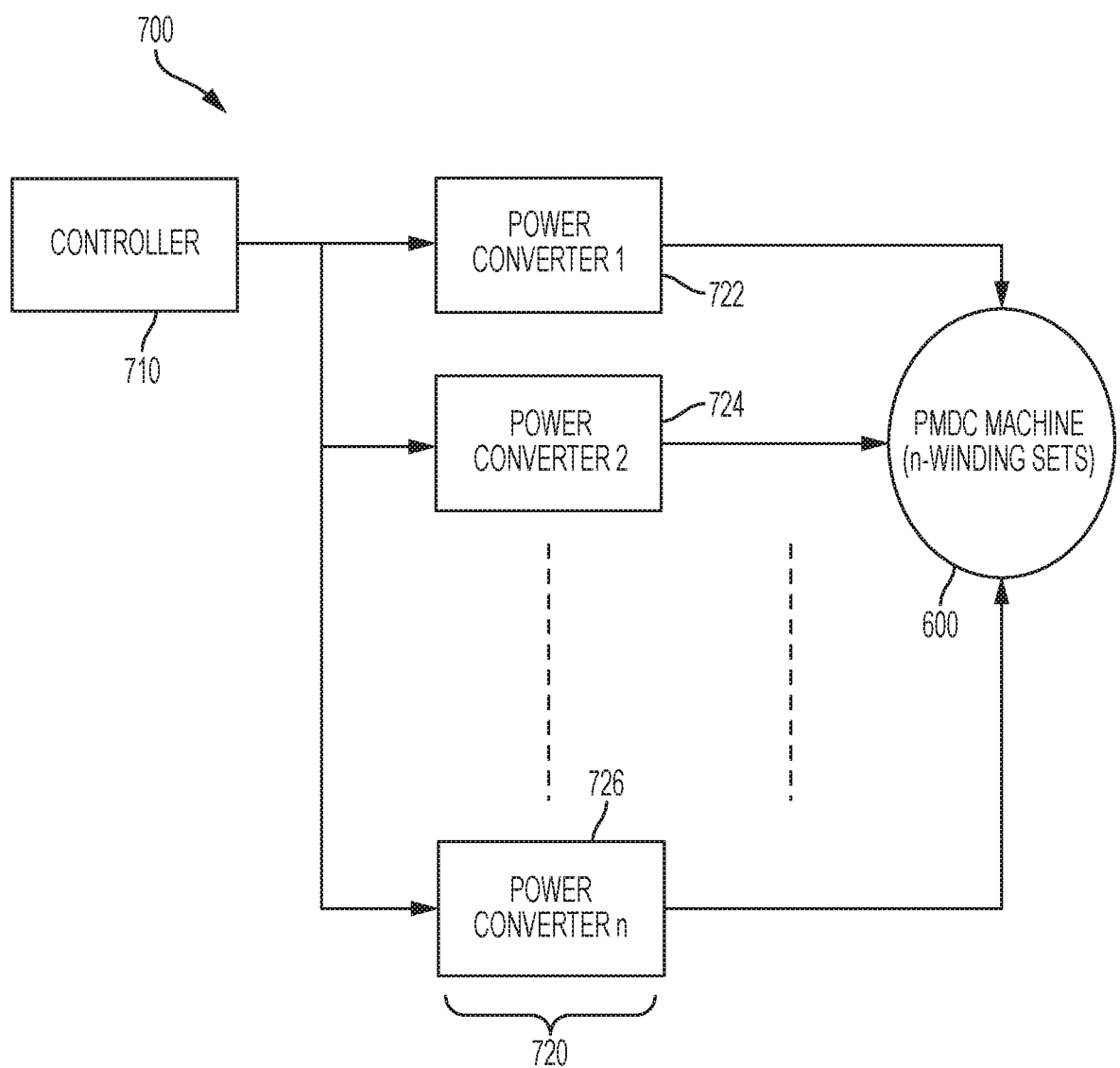
FIG. 7 depicts an example system 700 using a multi-winding PMDC machine according to one or more embodiments.

FIG. 7 depicts an example system 700 using a multi-winding PMDC machine according to one or more embodiments. The system 700 includes a multi-winding PMDC machine 600 that includes n-windings (n>=2). The system 700 further includes a controller 710 that controls operation of multiple power converters 720. The power converters 720 include one power converter for each winding in the multi-winding PMDC machine 600. For example, a first power converter 722 is associated with a first winding of the PMDC machine 600; a second power converter 724 is associated with a second winding of the PMDC machine 600, and so on with an nth power converter 726 associated with the nth winding of the PMDC machine 600.

The power converters 720 facilitate changing the voltage or frequency of the electrical energy supplied to the PMDC machine 600. The power converters shown include physical switches (such as MOSFETs) as well as additional electronic circuitry such as Gate Drives that supply voltages to the control input ports of the switches of the power converters. The control input ports, for instance, of MOSFET type switches are the gate input terminal. The Gate Drive output voltages are a result of the command signals sent by the controller 700 in order to control the current and torque of the PMDC machine.

In case of failure of one of the power converters 720, say the first converter 722, the controller 710 continues to operate the remaining healthy power converters (724-726). The corresponding windings of the PMDC machine 600 provide resulting torque output, which is $$\frac{n-1}{n}$$

of the total torque that was generated with all of windings (and converters) in operation. In other words, the controller 710 bypasses the failed first converter 722 and corresponding first winding and continues to operate the multi-winding PMDC machine 600 with n—1 windings, rather than the PMDC machine 600 being completely inoperative.

In addition to using a multi-wound PMDC machine and multiple power converters (H-bridges), the technical solutions herein facilitate additional levels of redundancy by using multiple microcontrollers corresponding respectively to the multiple windings in the multi-PMDC machine 600.

Figure 8:
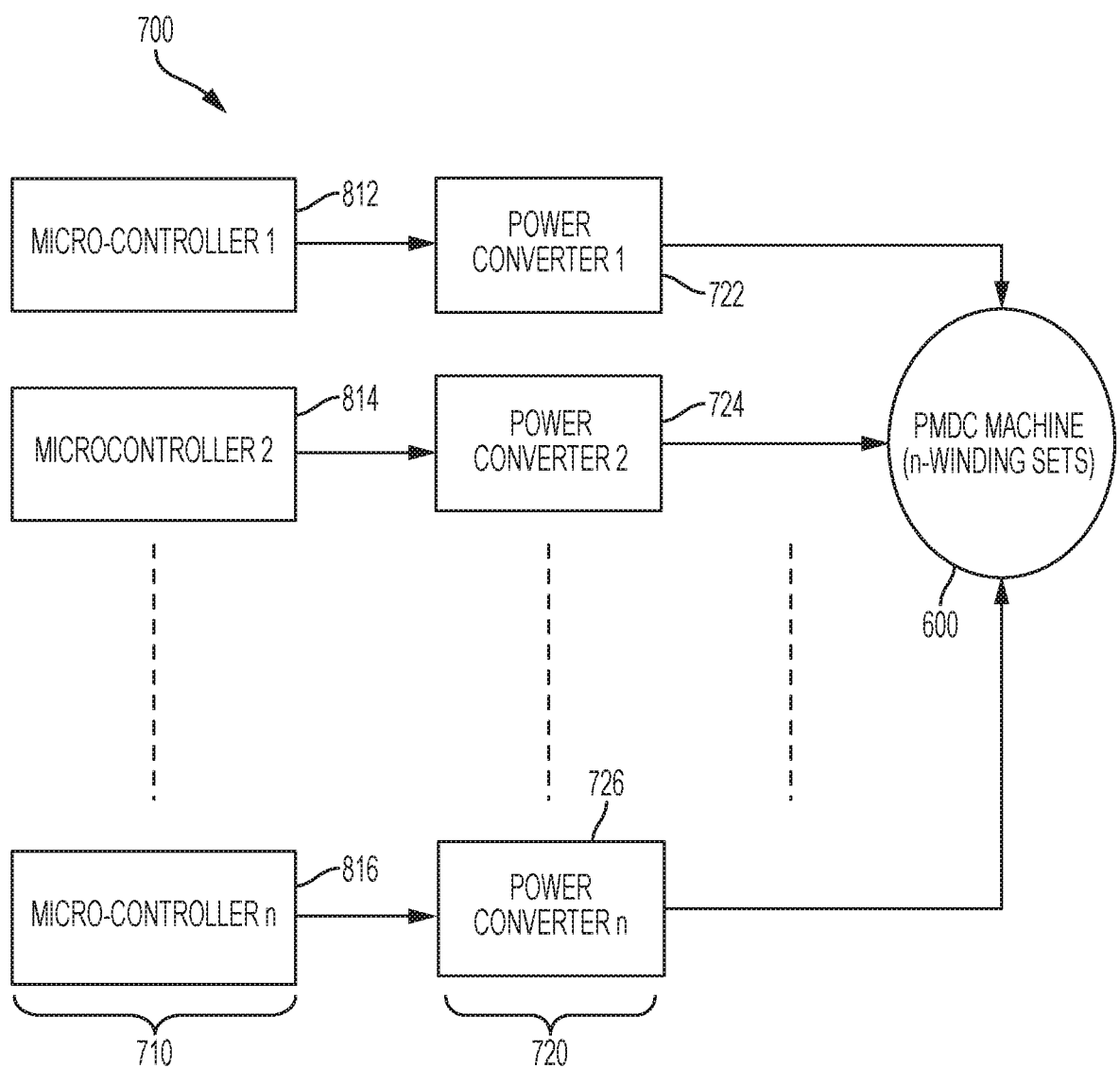
FIG. 8 depicts an example fault tolerant system according to one or more embodiments.

FIG. 8 depicts an example fault tolerant system according to one or more embodiments. The fault tolerant system 700 of FIG. 8 is more robust to machine failures, power converter failures, and controller failures with n levels of redundancy (n>=2), n being the number of windings in the PMDC machine, the number of power converters, and the number of corresponding controllers. The fault tolerant system 700 of FIG. 8 includes the multi-winding PMDC machine 600 with n winding sets, with multiple power converters 720 corresponding to each of the winding sets. Further, the system 700 includes a controller 710 that includes multiple controllers 812-816, each controller corresponding with a power converter from the multiple power converters 720. For example, a first controller 812 is associated with the first power converter 722, which is further associated with the first winding of the PMDC machine 600. Similarly, a second controller 814 is associated with the second power converter 724, which is further associated with the second winding of the PMDC machine 600, and so on until an nth controller 816 is associated with the nth power converter 726, which is further associated with the nth winding set of the PMDC machine 600.

Each of the controllers 710 operates independently of each other. Accordingly, in case of a failure in the first controller 812, the system 700 continues to generate at least a partial output torque 550 from the PMDC machine 600 using the remaining (healthy) controllers 814-816 from the controller 710. Further, in case of a failure of the first power converter 722, the system 700 continues to generate at least the partial output torque 550 from the PMDC machine 600 using the remaining (healthy) power converters 724-726. Further yet, in case of a failure of the first winding of the PMDC machine 600, the system 700 continues to generate at least a partial output torque 550 from the PMDC machine 600 using the remaining (healthy) windings from the PMDC machine 600.

Figure 9:
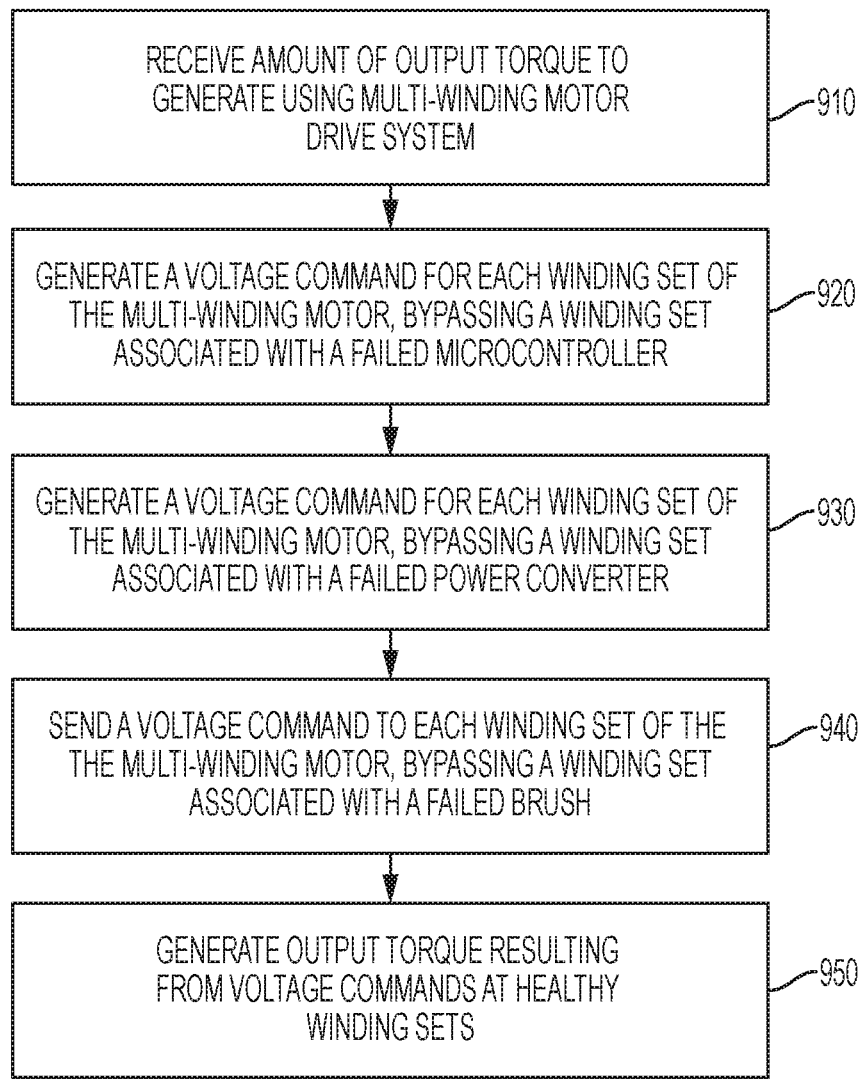
FIG. 9 illustrates a flowchart of an example method for providing fault tolerance in a PMDC motor control system using a multi-winding PMDC motor according to one or more embodiments.

FIG. 9 illustrates a flowchart of an example method for providing fault tolerance in a PMDC motor control system using a multi-winding PMDC motor according to one or more embodiments. The method includes the current controller 510 of the multi-winding PMDC motor 600 receiving an amount of output torque 550 to generate using the multi-winding PMDC motor drive system, as shown at 910. For example, the received output torque amount may be a desired output torque for an application such as providing an assist torque by the steering system 12. Alternatively, or in addition, the desired torque may be an amount of torque to be generated to control the steering system 12 in case of a fully automated driving experience, the output torque amount received from an automated driving assist unit (not shown) of the vehicle 10.

The method further includes generate a voltage command for each winding set of the multi-winding motor, bypassing a winding set associated with a failed microcontroller in the current controller 510, as shown at 920. For example, the current controller 510 includes multiple microcontrollers, each associated with respective winding set from the multi-winding PMDC motor 600. Each microcontroller generates a voltage command for the corresponding winding set based on predetermined parameters associated with the winding sets, such as back-EMF factors, torque factors, etc. in one or more examples, the parameters are symmetric across the multiple winding sets, each of the microcontrollers generating symmetric voltage commands. Alternatively, the winding sets do not have similar parameter values, each microcontroller generating different voltage commands. In case of a failed microcontroller, only the remaining health microcontrollers generate respective voltage commands.

The method further includes sending the voltage commands to the corresponding winding sets that have operational power converters, as shown at 930. For example, each winding set is associated with a respective power converter. In case a power converter has a failure, the corresponding winding set does no receive the corresponding voltage command.

Further, the method includes sending the voltage command to each winding set of the multi-winding motor, bypassing a winding set associated with a failed brush, as shown at 940. The voltage command is sent using a pair of terminals of the winding set drawn out from the brush pair of the winding set. For example, if the brush pair has a failure, such as a mechanical failure, the winding set does not receive the voltage command. Thus, only the healthy winding sets associated with healthy power converters and healthy microcontrollers receive voltage commands.

The method further includes generating an output torque based on the voltage commands received by the healthy winding sets, as shown at block 950. If all the winding sets are healthy, the output torque generated matches the received output torque amount, else the output torque is at least a portion of the desired output torque amount. The system thus provides fault tolerance because without the PMDC motor including multi-windings, the motor would have generated no torque at all. Such complete loss of torque may not be desired in safety critical applications, such as steering systems, automatic driving assist systems, and the like.

Figure 10:
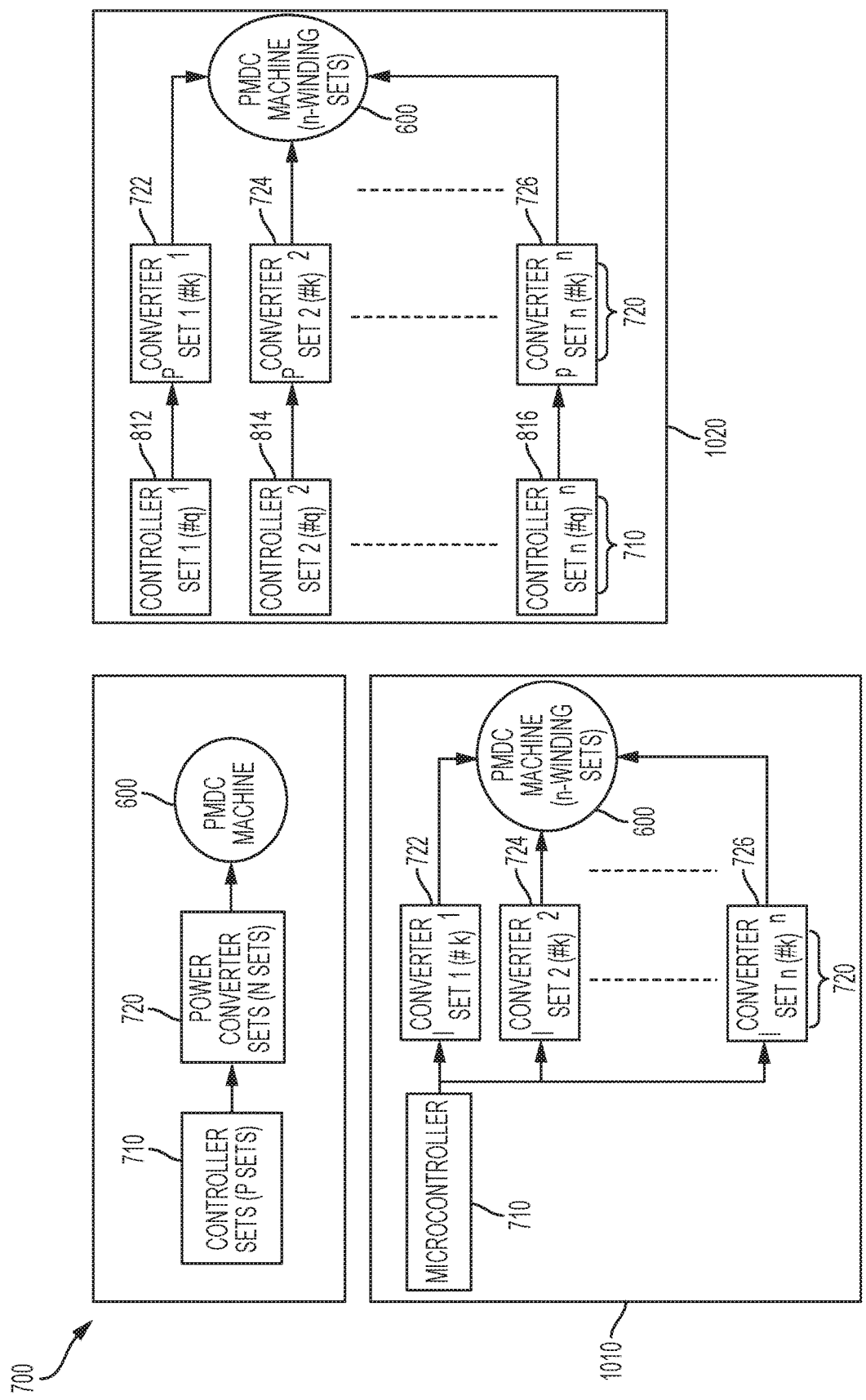
FIG. 10 depicts an example fault tolerant system architecture according to one or more embodiments.

FIG. 10 depicts an example fault tolerant system architecture according to one or more embodiments. The fault tolerant system 700 of FIG. 10 illustrates an architecture that is robust to machine failures, power converter failures, and controller failures with multiple layers of redundancy. As described herein, the PMDC machine 600 with n levels of redundancy (n>=2), n being the number of windings in the PMDC machine, provides an n-level redundancy for machine winding set failures. Further, the architecture 700 provides additional layers of redundancy and robustness by using multiple power converters 720 per winding set. For example, each winding set of the PMDC machine 600 is associated with a power converter set, each set having k power converters, k≥1. In this configuration, if a first power converter from a set of k power converters fails, one or more of the remaining k−1 power converters take over the operation of the failed power converter, thus providing redundancy and robustness to the failure of power converters. In one or more examples, k may be 2.

It should be noted that in a typical "healthy" operation, multiple power converters out of the total k may be operating, and when a single failure occurs then the remaining k−1 may share the burden in any combination. For instance, under healthy operation, k−2 converters may be working and when one of the operating converters fail, any k−2 of the may begin operating to keep the system working as before.

As depicted in an embodiment of the architecture in block 1010, a single controller 710 is associated with all N winding sets of the PMDC machine 600. Thus, each of the k power converters in the N sets of power converters is controlled by the single controller 710.

Further, the architecture 700 provides additional layers of redundancy and robustness by using multiple controllers 710 in one or more examples. For example, each winding set of the PMDC machine 600 is associated with a respective set of controllers 812, 814, 816. Each set of controllers may have q controllers, q≥1. In this configuration, if a first controller from a set of q controllers fails, one or more of the remaining q−1 controllers takes over the operation of the failed controller, thus providing redundancy and robustness to the failure of controllers. In one or more examples, q may be 2. As depicted in an embodiment of the architecture in block 1020, a set of q controllers 812 (814 and 816) is associated with each respective winding set of the PMDC machine 600.

It should be noted that in a typical "healthy" operation, multiple controllers out of the total q may be operating, and when a single failure occurs then the remaining q−1 may share the burden in any combination. For instance, under healthy operation, q−2 controllers may be working and when one of the operating controllers fail, any q−2 of the may begin operating to keep the system working as before.

The combination of the multiple (N) winding sets, in conjunction with multiple power converters per winding set (k), and multiple controllers per winding set (q) facilitates the fault tolerant system 700 with multiple layers of configurable redundancy and robustness.

The technical solutions described herein facilitate various fault tolerant systems using multi-winding PMDC machines. In addition the technical solutions facilitate fault tolerant systems that are more robust to machine and power converter failures (single controller) with n levels of redundancy and further to controller failures (multi-controller). The PMDC based electric drive system architectures described herein facilitate multiple levels of redundancy in the electrical machine, power converter, and logic circuitry (controllers). The drive architectures thus facilitate enhanced fault tolerance and fail safe operation in safety critical systems, such as steering systems, automated driving assist systems, and the like.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A system comprising:
   a permanent magnet DC (PMDC) motor comprising a plurality of winding sets:
   a first winding set comprising a first pair of magnet poles, a first pair of brushes, and a first winding; and
   a second winding set comprising a second pair of magnet poles, a second pair of brushes, and a second winding; and
   a controller configured to cause the PMDC motor to generate a predetermined amount of torque by:
   applying a first voltage command for the first winding set, the first winding set generates a first current in response to a first voltage corresponding to the first voltage command; and
   applying a second voltage command for the second winding set, the second winding set generates a second current in response to a second voltage corresponding to the second voltage command; and
   the first current and the second current cause the motor to generate the predetermined amount of torque.

2. The system of claim 1, further comprising a plurality of power converters, a power converter corresponding to each respective winding set.

3. The system of claim 2, wherein the controller comprises a plurality of controllers, a controller corresponding to each winding set, a first controller that generates the first voltage command for the first winding set, and a second controller that generates the second voltage command for the second winding set.

4. The system of claim 1, further comprising a plurality of power converters, a set of power converters corresponding to each respective winding set.

5. The system of claim 4, wherein the controller comprises a plurality of controllers, a set of controllers corresponding to each winding set.

6. The system of claim 1, wherein the controller comprises a plurality of controllers, a controller corresponding to each winding set, a first controller that generates the first voltage command for the first winding set, and a second controller that generates the second voltage command for the second winding set.

7. The system of claim 1, wherein the first winding set has a first pair of terminals and the second winding set has a second pair of terminals, wherein the first pair of terminals is drawn out from the first pair of brushes, and the second pair of terminals is drawn out from the second pair of brushes.

8. The system of claim 1, wherein, in response to a brush failure of the first winding set, the controller bypasses generating the first voltage command, and continues to generate the second voltage command for the second winding set.

9. A permanent magnet DC (PMDC) motor comprising:
a plurality of winding sets comprising:
a first winding set comprising a first pair of magnet poles, a first pair of brushes, and a first winding; and
a second winding set comprising a second pair of magnet poles, a second pair of brushes; and a second winding;
the first winding set generates a first current command in response to a first voltage corresponding to a first voltage command from a controller; and
the second winding set generates a second current command in response to a second voltage corresponding to a second voltage command from the controller.

10. The PMDC motor of claim 9, further comprising a plurality of power converters, a power converter corresponding to each respective winding set.

11. The PMDC motor of claim 10, wherein the controller comprises a plurality of controllers, a controller corresponding to each winding set, a first controller that generates the first voltage command for the first winding set, and a second controller that generates the second voltage command for the second winding set.

12. The PMDC motor of claim 9, further comprising a plurality of power converters, a set of power converters corresponding to each respective winding set.

13. The PMDC motor of claim 12, wherein the controller comprises a plurality of controllers, a set of controllers corresponding to each winding set.

14. The PMDC motor of claim 9, wherein the controller comprises a plurality of controllers, a controller corresponding to each winding set, a first controller that generates the first voltage command for the first winding set, and a second controller that generates the second voltage command for the second winding set.

15. The PMDC motor of claim 9, wherein the first winding set has a first pair of terminals and the second winding set has a second pair of terminals, wherein the first winding set has a first power converter and the second winding set has a second power converter.

16. A method for generating an output torque from a multi-winding PMDC motor, the method comprising:
generating, by a current controller, a first voltage command for a first winding set from a plurality of winding sets of the PMDC motor, the first winding set generates a first current in response to the first voltage command; and
generating, by the current controller, a second voltage command for the second winding set from the winding sets of the PMDC motor, the second winding set generates a second current in response to the second voltage command; and
generating; by the PMDC motor, the output torque based on the first current and the second current.

17. The method of claim 16, wherein the PMDC motor is associated with a plurality of power converters, a power converter corresponding to each respective winding set of the PMDC motor.

18. The method of claim 17, wherein the current controller comprises a plurality of controllers, a controller corresponding to each winding set, a first controller that generates the first voltage command for the first winding set; and a second controller that generates the second voltage command for the second winding set.

19. The method of claim 16, wherein the PMDC motor is associated with a plurality of power converters, a set of power converters corresponding to each respective winding set.

20. The method of claim 16, wherein, in response to a brush failure of the first winding set, the controller bypasses generating the first voltage command, and continues to generate the second voltage command for the second winding set.

* * * * *